United States Patent
Kim et al.

(10) Patent No.: US 7,518,546 B2
(45) Date of Patent: Apr. 14, 2009

(54) METHOD AND APPARATUS FOR MEASURING DISTANCE USING LOW CLOCK RATE SIGNAL

(75) Inventors: Jae-hyon Kim, Suwon-si (KR); Young-hwan Kim, Taean-eup (KR); Dmitriev S. Alexander, Moscow (RU); Andreyev V. Yuri, Moscow (RU); Seong-soo Lee, Suwon-si (KR)

(73) Assignees: Samsung Electronics Co., Ltd., Suwon-si (KR); Institute of Radio Engineering and Electronics of RAS, Moscow (RU)

( * ) Notice: Subject to any disclaimer, the term of this patent is extended or adjusted under 35 U.S.C. 154(b) by 158 days.

(21) Appl. No.: 11/369,724

(22) Filed: Mar. 8, 2006

(65) Prior Publication Data

US 2006/0214840 A1 Sep. 28, 2006

(30) Foreign Application Priority Data

Mar. 25, 2005 (KR) .................. 10-2005-0024961

(51) Int. Cl.
*G01S 13/08* (2006.01)
(52) U.S. Cl. ..................................... 342/118
(58) Field of Classification Search .................. 342/118
See application file for complete search history.

(56) References Cited

U.S. PATENT DOCUMENTS

| 3,952,303 A * | 4/1976 | Watanabe et al. ............ 342/112 |
| 4,336,539 A * | 6/1982 | Hendrickson ................ 342/55 |
| 5,025,260 A | 6/1991 | Colquhoun et al. |
| 5,726,742 A * | 3/1998 | Nourrcier ................... 356/5.01 |
| 6,133,876 A * | 10/2000 | Fullerton et al. ............. 342/375 |
| 6,333,710 B1 * | 12/2001 | Reiche et al. ................ 342/118 |
| 6,373,428 B1 * | 4/2002 | McEwan ..................... 342/175 |
| 6,462,705 B1 * | 10/2002 | McEwan ..................... 342/175 |
| 6,647,246 B1 * | 11/2003 | Lu .......................... 455/67.11 |
| 6,812,884 B2 * | 11/2004 | Richley et al. .............. 342/125 |
| 2006/0197701 A1 * | 9/2006 | Heide et al. ................. 342/118 |

FOREIGN PATENT DOCUMENTS

| JP | 7-198837 A | 8/1995 |
| JP | 07-198837 A | 8/1995 |
| JP | 9-166661 A | 5/1997 |
| JP | 09-166661 A | 6/1997 |

* cited by examiner

*Primary Examiner*—Thomas H Tarcza
*Assistant Examiner*—Matthew M Barker
(74) *Attorney, Agent, or Firm*—Sughrue Mion, PLLC

(57) ABSTRACT

Provided is an apparatus and a method of measuring a distance between devices using a low clock frequency signal. The apparatus includes clock frequency generators, counters, a controller and a calculator for determining the distance based on clock signal overlap. Radio waves are transmitted and a number of clocks of a clock signal having a clock frequency b are counted, and if the transmitted radio waves are received again, a number of clocks of a clock signal having a clock frequency a are counted. If the clock signals having the clock frequencies a and b overlap with each other, counting of the numbers of the clocks of the clock signals having the frequencies b and a stops, and the distance is measured using the count values of the clock signals having the clock frequencies a and b. As a result, number of clocks of clock signals having low clock frequencies with a uniform difference can be counted to precisely measure a distance.

12 Claims, 3 Drawing Sheets

METHOD AND APPARATUS FOR MEASURING DISTANCE USING LOW CLOCK RATE SIGNAL

CROSS-REFERENCE TO RELATED APPLICATIONS

This application claims the benefit under 35 U.S.C. § 119 (a) from Korean Patent Application No. 2005-24961 filed on Mar. 25, 2005 in the Korean Intellectual Property Office, the disclosure of which is incorporated herein by reference.

BACKGROUND OF THE INVENTION

1. Field of the Invention

The present invention relates to a method of measuring a distance between two devices, and more particularly, to a method of improving precision of measuring a distance between two devices using a low clock rate signal.

2. Description of the Related Art

In general, radio waves are used to measure a distance between devices A and B. FIG. 1 is a view illustrating a process of measuring a distance between devices A and B according to the prior art. The process of measuring the distance between the devices A and B according to the prior art will now be described with reference to FIG. 1.

The device A transmits radio waves to the device B in operation S100 so as to measure a distance between device A and device B. In this case, the device A counts a clock of a clock signal having a uniform clock rate upon transmitting the radio waves. In general, the radio waves are transmitted at a light speed. The device B receives the radio waves and processes the radio waves in operation S102. In other words, the device B performs predetermined processing to re-transmit the radio waves to the device A.

The device B transmits the radio waves having undergone the predetermined processing to the device A in operation S104. The device A stops counting the clock and calculates a count value in operation S106. The device A measures the distance from the device B using the count value. Here, the device A calculates the distance in consideration of a time required for transmission and reception of the radio waves after subtracting a time required for the predetermined processing at the device B therefrom.

For example, if the clock frequency of the clock signal counted by the device A is 100 MHz, the radio wave moves 3 m for a clock of the clock signal. Thus, if the count value of the device A is "100," the distance between the devices A and B is 150 m. Also, if the clock frequency of the clock signal counted by the device A is 10 MHz, the radio wave moves 30 m for a clock of the clock signal. Thus, if the count value of the clock at the device A is "100," the distance between the devices A and B is 1500 m. As described above, a movement distance of the radio wave for a clock varies with a clock frequency of a counted clock signal. An error in a measured distance depends on the clock frequency of the counted clock signal. As the clock frequency of the counted clock signal is high, the error in the measured distance is small. As the clock frequency of the counted clock signal is low, the error in the measured distance is large. In more detail, if the clock frequency of the counted signal is 100 MHz, the measured distance has an error of 3 m. However, if the clock frequency of the counted signal is 10 MHz, the measured distance has an error of 30 m.

Accordingly, a high frequency clock signal may be used to reduce an error in the distance between the devices A and B. However, a high frequency clock signal generator generating a high frequency clock signal is more expensive and more difficult to be realized than a low frequency clock signal generator. Therefore, a method of improving precision of measuring a distance between devices using a low frequency clock signal is required.

SUMMARY OF THE INVENTION

Accordingly, the present general inventive concept has been made to address the above-mentioned and/or problems, and an aspect of the present general inventive concept is to provide a method of precisely measuring a distance between devices using a low frequency clock signal.

Another aspect of the present general inventive concept is to provide a method of reducing cost for components necessary for measuring a distance.

According to an aspect of the present invention, there is provided a method of measuring a distance of a device, including: transmitting radio waves and counting (N3) a number of clocks of a clock signal having a clock frequency b; if the radio waves are received, counting (N1) a number of clocks of a clock signal having a clock frequency a; if the signals having the clock frequencies a and b overlap with each other, stopping counting the numbers of the clocks of the clock signals having the clock frequencies a and b; and measuring the distance using the count values of the clock signals having the clock frequencies a and b.

According to another aspect of the present invention, there is provided an apparatus for measuring a distance of a device, including: a third counter transmitting radio waves and counting (N3) a number of clocks of a clock signal having a clock frequency b; if the radio waves are received, a first counter counting (N1) a number of clocks of a clock signal having a clock frequency a; if the clock signals having the clock frequencies a and b overlap with each other, a controller instructing the third and first counters to stop counting the number of the clocks of the clock signals having the clock frequencies b and a; and a calculator calculating the distance using the count values of the third and first counters according to a control command of the controller.

The present invention suggests a method of using two low frequency clock signals having clock frequencies with a difference to precisely measure a distance.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS

Figure 1:
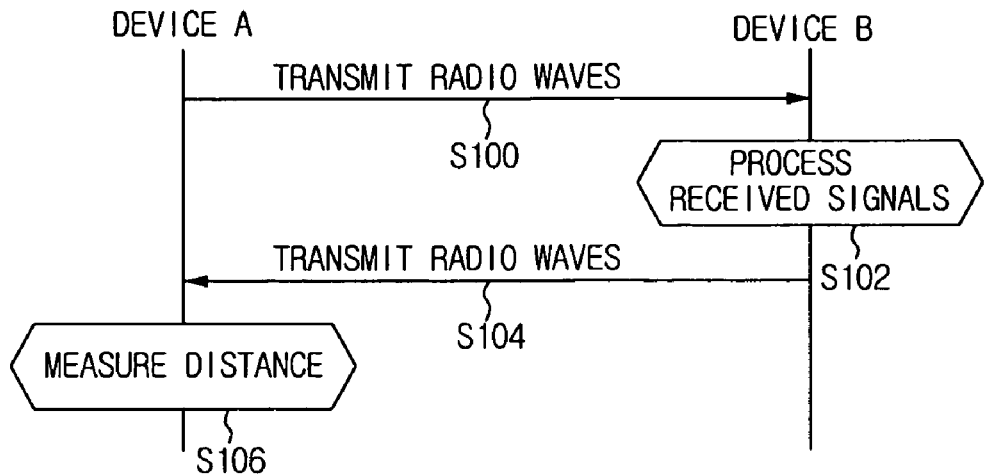
FIG. 1 is a view illustrating a process of measuring a distance between devices according to the prior art.

Certain exemplary embodiments of the present invention will be described in greater detail with reference to the accompanying drawings.

In the following description, same drawing reference numerals are used for the same elements even in different drawings. The matters defined in the description including the detailed construction and elements are mainly provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
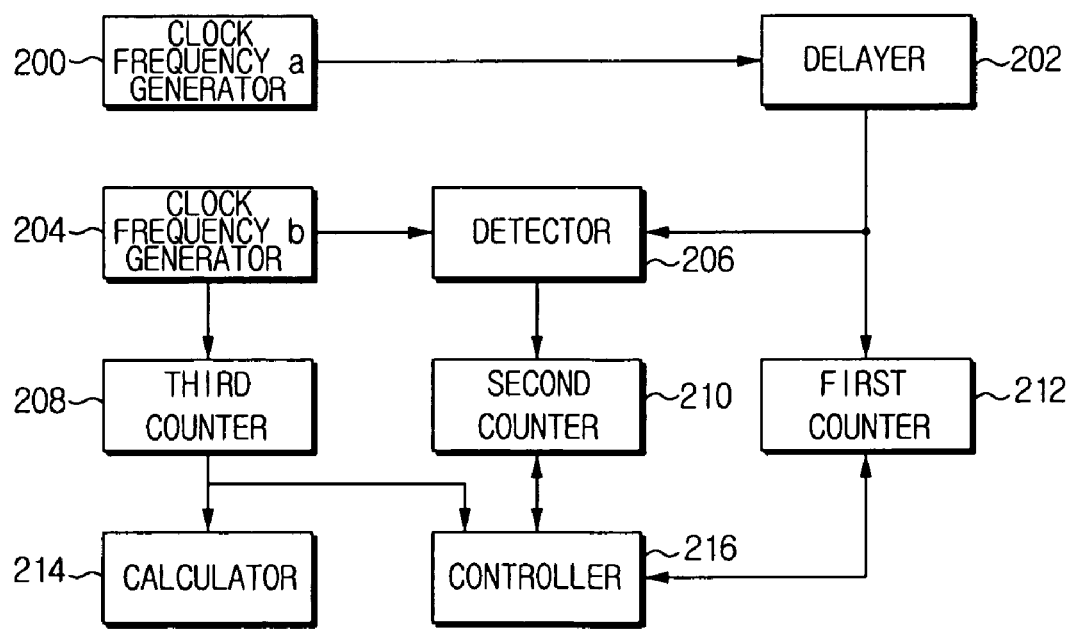
FIG. 2 is a block diagram of a device measuring a distance according to an exemplary embodiment of the present invention.

FIG. 2 is a block diagram of a transmitter device measuring a distance between devices according to an embodiment of the present invention. Referring to FIG. 2, the transmitter device includes a clock frequency a generator 200, a clock frequency b generator 204, a delayer 202, a detector 206, first, second, and third counters 212, 210, and 208, a calculator 214, and a controller 216. Operations of the components of the transmitter device will now be described in detail.

The clock frequency a generator 200 generates a clock signal having a clock frequency a. The clock frequency a generator 200 transmits the signal to the delayer 202. The clock frequency b generator 204 generates a clock signal having a clock frequency b. In general, the clock frequency a is relatively lower than the clock frequency b. For example, if the clock frequency a is 2.000 MHz, the clock frequency b is 2.002 MHz. In this case, a difference between the clock frequencies a and b is smaller than intensities of the clock frequencies a and b.

If the transmitter device transmits radio waves such as chaotic pulse in accordance with the clock frequency a to a receiver device, the third counter 208 performs counting. In other words, the third counter 208 performs the counting using a clock of the clock signal having the clock frequency b. The delayer 202 delays the clock signal having the clock frequency a for a predetermined period of time. In other words, the delayer 202 delays the clock signal generated by the clock frequency a generator 200 until the radio waves are received after being re-transmitted from the receiver device. When the radio waves are received from the receiver device, the delayer 202 transmits the delayed clock signal to the first counter 212. The first counter 212 performs counting using a clock of the clock signal having the clock frequency a as delayed by delayer 202. The detector 206 detects an overlap between the clock signal generated by the clock frequency b generator 204 and the clock signal delayed by the delayer 202. The detector 206 transmits information on the overlap between the clock signal generated by the clock frequency b generator 204 and the clock signal delayed by the delayer 202 to the second counter 210. The second counter 210 counts a number of overlaps between the clock signal generated by the clock frequency b generator 204 and the clock signal delayed by the delayer 202 using the information. This will be described in detail with reference to FIG. 4.

The calculator 214 calculates a distance between the transmitter device and the receiver device using count values transmitted from the first, second, and third counters 212, 210, and 208. A process of calculating the distance via the calculator 214 will be described later.

The controller 216 controls operations of the components of the transmitter device. In particular, if the radio waves are received from the receiver device, the controller 216 controls the delayer 202 to transmit the clock signal generated by the clock frequency a generator 200 to the first counter 212. As a result, the first counter 212 can count the clock of the clock signal having the clock frequency a.

Figure 3:
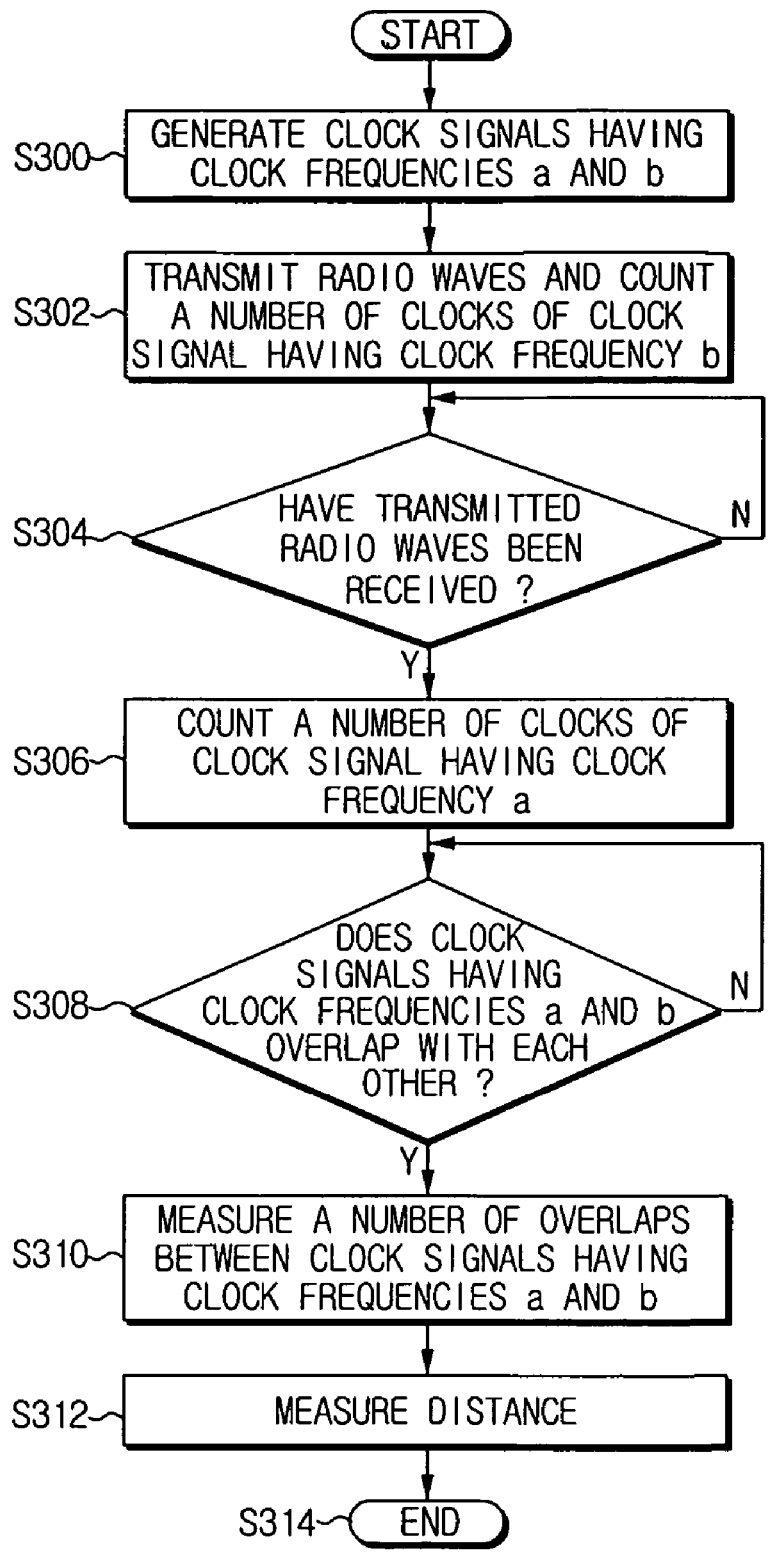
FIG. 3 is a flowchart of a method of measuring a distance via a device according to an exemplary embodiment of the present invention.

FIG. 3 is a flowchart of an operation of a transmitter device according to an embodiment of the present invention. The operation of the transmitter device will now be described with reference to FIG. 3.

In operation S300, the transmitter device generates clock signals having clock frequencies a and b. As described above, a difference between the clock frequencies a and b is smaller than intensities of the clock frequencies a and b. In other words, the clock frequencies a and b satisfy Equation 1:

frequency a>>frequency b−frequency a frequency b>>frequency b−frequency a  (1)

In operation S302, the transmitter device transmits radio waves to a receiver device to measure a distance with the receiver device and counts a clock of the clock signal having the clock frequency b. In other words, the transmitter device transmits the radio waves and starts the third counter. The radio waves transmitted to the receiver device may include information for measuring the distance. In other words, if the receiver device receives the radio waves, the radio waves may include information instructing the receiver device to re-transmit the received radio waves.

In operation S304, the transmitter device determines whether the transmitted radio waves have been received from the receiver. If the transmitter device determines in operation S304 that the transmitted radio waves have been received, the transmitter device moves to operation S306. If the transmitter device determines in operation S304 that the transmitted radio waves have not been received, the flow returns to operation S304.

In operation S306, the transmitter device counts a number of clocks of the clock signal having the clock frequency a. As described above, the transmitter device transmits the radio waves, counts a number of clocks of the clock signal having the clock frequency b, and if the transmitted radio waves are received, counts the number of the clocks of the clock signal having the clock frequency a.

In operation S308, the transmitter device determines whether the clock signals having the clock frequencies a and b overlap with each other. If the transmitter device determines in operation S308 that the clock signals having the clock frequencies a and b overlap with each other, the transmitter device moves to operation S310. If the transmitter device determines in operation S308 that the clock signals having the clock frequencies a and b do not overlap with each other, the flow returns to operation S308.

In operation S310, the transmitter device measures (counts) a number of overlaps between the clock signals having the clock frequencies a and b, where the clock signal having clock frequency a is delayed by delayer 202. In operations S312, the transmitter device measures a distance between the transmitter device and the receiver device using the counted values. In other words, the transmitter device counts the numbers of the clocks of the clock signals having the clock frequencies a and b until overlapping between the clock signals having the clock frequencies a and b stops and measures the distance using the counted values. A method of measuring the distance will be described later.

Figure 4:
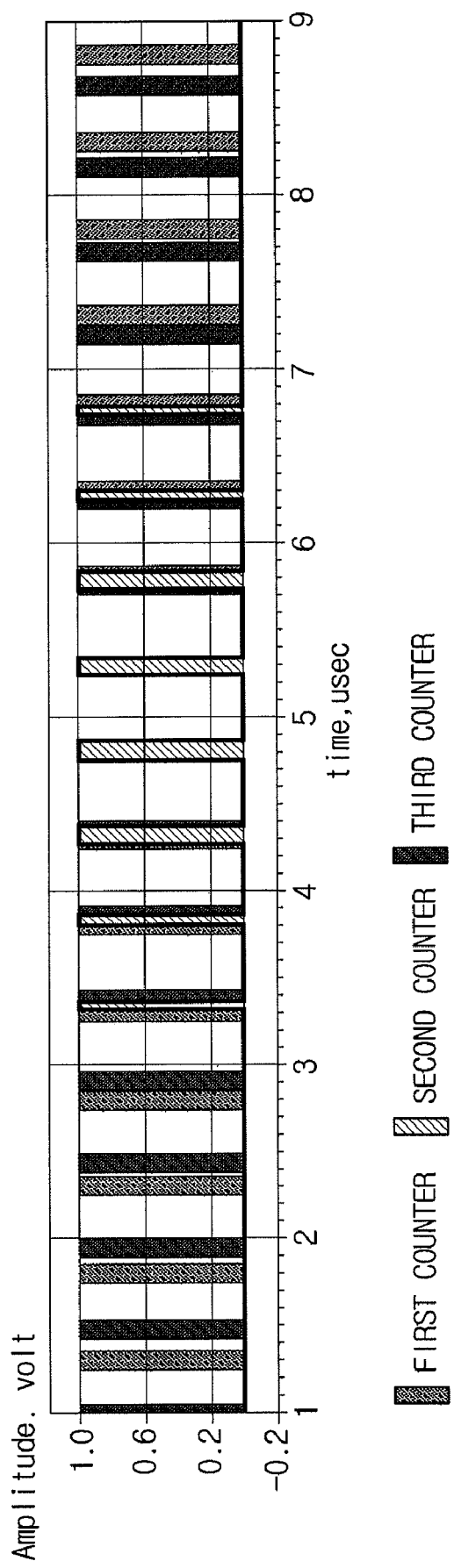
FIG. 4 is a view illustrating counting operations of counters constituting a device according to an exemplary embodiment of the present invention.

FIG. 4 is a view illustrating counting operations of first through third counters according to an embodiment of the present invention. As described above, the third counter counts a number of clocks of a clock signal having a clock frequency b, and the first counter counts a number of clocks of a clock signal having a clock frequency a. The second counter counts a number of overlaps between the clock signals having the clock frequencies a and b.

In particular, FIG. 4 illustrates a case where a transmitter device receives radio waves that have been transmitted. Thus, the first counter measures the number of the clocks of the clock signal having the clock frequency a. The third counter starts counting the number of the clocks of the clock signal having the clock frequency b from when the radio waves are transmitted. When the second counter starts counting the number of the overlaps between the clock signals having the clock frequencies a and b, the first and third counters respectively stop counting the numbers of the clocks of the clock signals having the clock frequencies a and b. As shown in FIG. 4, a count value of the first counter is "4," and a count value of the third counter is "4+a count value before receiving radio waves."

As shown in FIG. 4, the clock signals having the clock frequencies a and b overlap with each other eight times after 3 μs. The overlap between the clock signals having the clock frequencies a and b may be obtained by comparing an overlapped amount between energies of the clock signals having the clock frequencies a and b. In other words, if the overlapped amount between the energies of the clock signals having the clock frequencies a and b is more than or equal to a set value, it is determined that the clock signals having the clock frequencies a and b overlap with each other. If the overlapped amount between the energies of the clock signals having the clock frequencies a and b is less than or equal to the set value, it is determined that the clock signals having the clock frequencies a and b do not overlap with each other.

A time substantially required for transmitting the radio waves can be expressed using the count values of the first through third counters as in Equation 2:

$$T_x = \frac{N3 + 0.5 \times N2}{b} - \frac{N1 + 0.5 \times N2}{a} \quad (2)$$

wherein $T_x$ denotes a time required for receiving transmitted radio waves, N1 denotes the count value of the first counter, N2 denotes the count value of the second counter, N3 denotes the count value of the third counter, b denotes a clock frequency of the clock signal having the clock frequency b, and a denotes a clock frequency of the clock signal having the clock frequency a. The count value of the second counter is divided by "2" to precisely detect a time when the clock signals having the clock frequencies a and b precisely overlap with each other. In other words, if the N2 is "4" as shown in FIG. 4, the clock signals having the clock frequencies a and b precisely overlap with each other. A distance may be measured using a time when the clock signals having the clock frequencies a and b initially overlap with each other for the first time. In other words, Equation 2 can be expressed as in Equation 3:

$$T_x = \frac{N3}{b} - \frac{N1}{a} \quad (3)$$

The distance between the transmitter device and the receiver device can be expressed as in Equation 4:

$$S = 0.5c \times (T_x - \tau_0) \quad (4)$$

wherein S denotes the distance between the transmitter device and the receiver device, c denotes a light speed, and $\tau_0$ denotes a time required for re-transmitting radio waves using the receiver device. As a result, the transmitter device can precisely measure a distance using a low clock frequency.

As described above, in a method and an apparatus for measuring a distance using a low clock frequency signal according to the present invention, numbers of clocks of clock signals having low clock frequencies having a uniform difference can be counted to precisely measure the distance. In other words, a number of clocks of a clock signal having a clock frequency of 100 MHz can be counted to obtain an effect as like a distance is measured using a number of clocks of a clock signal having a clock frequency between 2 GHz and 4 GHz. As a result, a distance between 30 cm and 100 cm can be precisely measured using the clock signal having the clock frequency of 100 MHz.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of measuring a distance, comprising:
transmitting predetermined radio waves;
generating a first clock signal having a clock frequency b and counting N3 a number of clocks of the first clock signal;
generating a second clock signal having a clock frequency a and delaying the second clock signal until the transmitted radio waves are received to generate a delayed second clock signal;
counting N1 a number of clocks of the delayed second clock signal having the clock frequency a; and
measuring the distance using the count values N1, N3 of the clock signals having the clock frequencies a and b,
stopping the counting of N1 and N3 when the first clock signal and the delayed second clock signal overlap,
counting N2 a number of overlaps between the first clock signal and the delayed second clock signal; and
measuring the distance using the counts N1, N2, and N3.

2. The method of claim 1, wherein a clock frequency of the clock signal having the clock frequency b is higher than a clock frequency of the clock signal having the clock frequency a.

3. The method of claim 2, wherein the clock frequencies of both clock frequency a and clock frequency b are greater than the difference between clock frequency a and clock frequency b.

4. The method of claim 1, wherein a time $T_x$ when the transmitted radio waves are received again is calculated using Equation as follows:

$$T_x = \frac{N3 + 0.5 \times N2}{b} - \frac{N1 + 0.5 \times N2}{a}.$$

5. The method of claim 4, wherein the device calculates the distance S using Equation as follows:

$$S = 0.5c \times (T_x - \tau_0)$$

wherein c denotes a light speed, and $\tau_0$ denotes a time required for re-transmitting the radio waves received by a receiver device.

6. The method of claim 1, wherein overlaps are determined to occur when a combined energy of the first clock signal and the delayed second clock signal exceeds a predetermined value.

7. An apparatus for measuring a distance between devices, comprising:
   a clock signal generator that generates a first clock signal having a clock frequency b and a second clock signal having a clock frequency a;
   a first counter that transmits radio waves of the first clock signal and counts N3 a number of clocks of the first clock signal;
   a delayer that delays a second clock signal having a clock frequency a;
   a second counter that counts N1 a number of clocks of the second clock signal delayed by the delayer;
   a controller that determines when the transmitted radio waves are received and instructs the second counter to count the clocks of the second clock signal delayed;
   a calculator that calculates the distance between devices using count N1 and count N3; and
   a third counter that counts N2 a number of overlaps between the first clock signal and the second clock signal delayed by the delayer,
   wherein the controller stops the counting of N1 and N3 when the first clock signal and the second clock signal delayed overlap,
   wherein the distance is measured using N1, N2, and N3.

8. The apparatus of claim 7, wherein the clock frequency b is higher than the clock frequency a.

9. The apparatus of claim 8, wherein the clock frequencies of both the clock frequency a and the clock frequency b are greater than the difference between the clock frequency a and the clock frequency b.

10. The apparatus of claim 7, wherein the calculator calculates a time $T_x$ when the transmitted radio waves are received again using Equation as follows:

$$T_x = \frac{N3 + 0.5 \times N2}{b} - \frac{N1 + 0.5 \times N2}{a}.$$

11. The apparatus of claim 10, wherein the calculator calculates the distance S using Equation as follows:

$$S = 0.5 c \times (T_x - \tau_0)$$

wherein c denotes a light speed, and $\tau_0$ denotes a time required for re-transmitting the radio waves received by a receiver device.

12. The apparatus of claim 7, wherein overlaps are determined to occur when a combined energy of the first clock signal and the delayed second clock signal exceeds a predetermined value.

* * * * *